United States Patent
Okawa

(12) 
(10) Patent No.: US 6,455,640 B2
(45) Date of Patent: Sep. 24, 2002

(54) METHOD FOR PRODUCING BASIC AMINO ACID-MODIFIED ORGANOPOLYSILOXANE

(75) Inventor: Tadashi Okawa, Chiba Prefecture (JP)

(73) Assignee: Dow Corning Toray Silicone, Co., Ltd., Tokyo (JP)

( * ) Notice: Subject to any disclaimer, the term of this patent is extended or adjusted under 35 U.S.C. 154(b) by 1 day.

(21) Appl. No.: 09/812,446

(22) Filed: Mar. 20, 2001

(30) Foreign Application Priority Data

Apr. 25, 2000 (JP) ........................................ 2000-123954

(51) Int. Cl.[7] .............................................. C08L 83/04
(52) U.S. Cl. ........................... 525/474; 528/26; 528/28; 528/33
(58) Field of Search .............................. 528/26, 28, 33; 525/474

(56) References Cited

U.S. PATENT DOCUMENTS

| | | | |
|---|---|---|---|
| 4,931,062 A | 6/1990 | Bay et al. | 8/94.23 |
| 5,015,700 A | 5/1991 | Herzig et al. | 525/487 |
| 5,117,001 A | 5/1992 | Okinoshima et al. | 549/214 |
| 5,166,363 A | 11/1992 | Kikuchi et al. | 549/214 |
| 6,268,454 B1 * | 7/2001 | Song et al. | |

FOREIGN PATENT DOCUMENTS

| | | |
|---|---|---|
| DE | 2740019 | 9/1977 |
| DE | 994144 | 10/1999 |
| JP | 50-158700 | 12/1975 |
| JP | 52-3023 | 1/1977 |
| JP | 52-114699 | 9/1977 |
| JP | 63-270690 | 11/1988 |
| JP | 4-89492 | 3/1992 |
| JP | 5-331291 | 12/1993 |

* cited by examiner

*Primary Examiner*—Robert Dawson
*Assistant Examiner*—Kuo-Liang Peng
(74) *Attorney, Agent, or Firm*—Charles R. Richard; Larry A. Milco

(57) ABSTRACT

A method for producing a basic amino acid-modified organopolysiloxane comprising reacting (A) a basic amino acid with (B) an organopolysiloxane having carboxylic anhydride groups bonded to silicon atoms.

7 Claims, 4 Drawing Sheets

METHOD FOR PRODUCING BASIC AMINO ACID-MODIFIED ORGANOPOLYSILOXANE

FIELD OF THE INVENTION

The present invention relates to a method for producing a basic amino acid-modified organopolysiloxane, and more particularly to a method for the efficient production of a basic amino acid-modified organopolysiloxane having carboxy groups and amino groups derived from amino acids.

BACKGROUND OF THE INVENTION

Examples of methods for producing amino acid-modified organopolysiloxanes include methods in which N-acylamino acids and organopolysiloxanes containing intramolecular alkyl halide groups are allowed to react in an aprotic polar solvent (see Japanese Patent Application Laying Open No. Sho 50-158700), methods in which amino acids and organopolysiloxanes whose hydroxyl groups are bonded to intramolecular carbon are allowed to react in the presence of an acid catalyst (see Japanese Patent Application Laying Open No. Sho 52-3023), and methods in which amino acids with protected carboxy groups and organopolysiloxanes containing intramolecular epoxy groups are allowed to react with each other (see Japanese Patent Application Laying Open No. Sho 52-114699).

The methods proposed in Japanese Patent Application Laying Open No. Sho 50-158700 and Japanese Patent Application Laying Open No. Sho 52-3023 are disadvantageous, however, in that because the carboxy groups of the amino acids are involved in the reaction, the carboxy groups derived from the amino acids are absent from the resulting amino acid-modified organopolysiloxanes, which thus lack the properties normally associated with amino acids. In addition, the methods proposed in Japanese Patent Application Laying Open No. Sho 52-114699 are disadvantageous in that the carboxy groups of the amino acids must be protected in the form of alkali metal salts, and the alkali metals must be removed from the resulting amino acid-modified organopolysiloxanes.

Specifically, an object of the present invention is to provide a method for the efficient production of a basic amino acid-modified organopolysiloxane having carboxy groups and amino groups derived from amino acids.

SUMMARY OF THE INVENTION

The present invention relates to a method for producing a basic amino acid-modified organopolysiloxane comprising reacting (A) a basic amino acid with (B) an organopolysiloxane having carboxylic anhydride groups bonded to silicon atoms.

DESCRIPTION OF THE INVENTION

Figure 1:
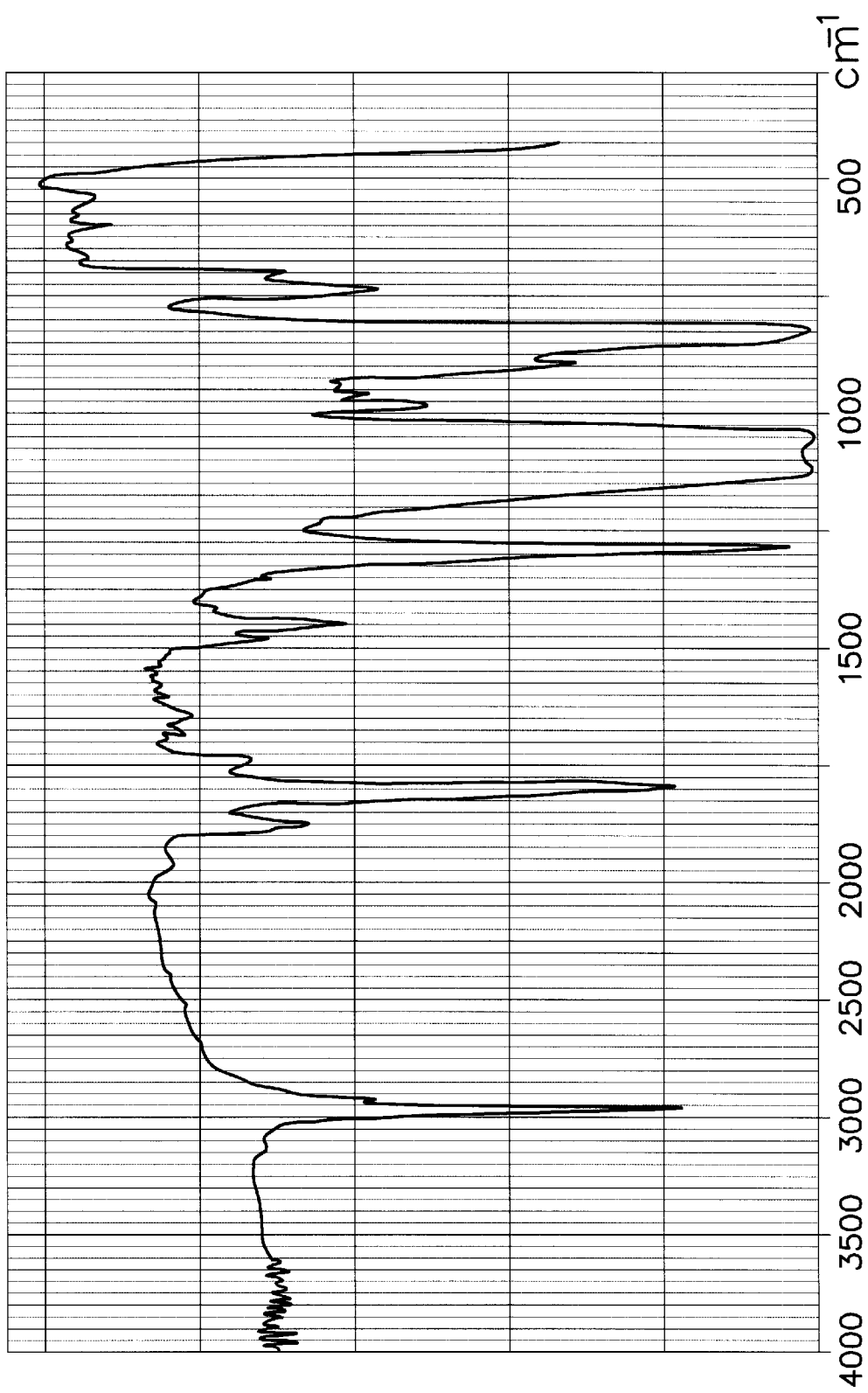
FIG. 1. An infrared absorption spectral trace of the dimethylpolysiloxane containing carboxylic anhydride groups that was prepared in Reference Example 1.
Figure 2:
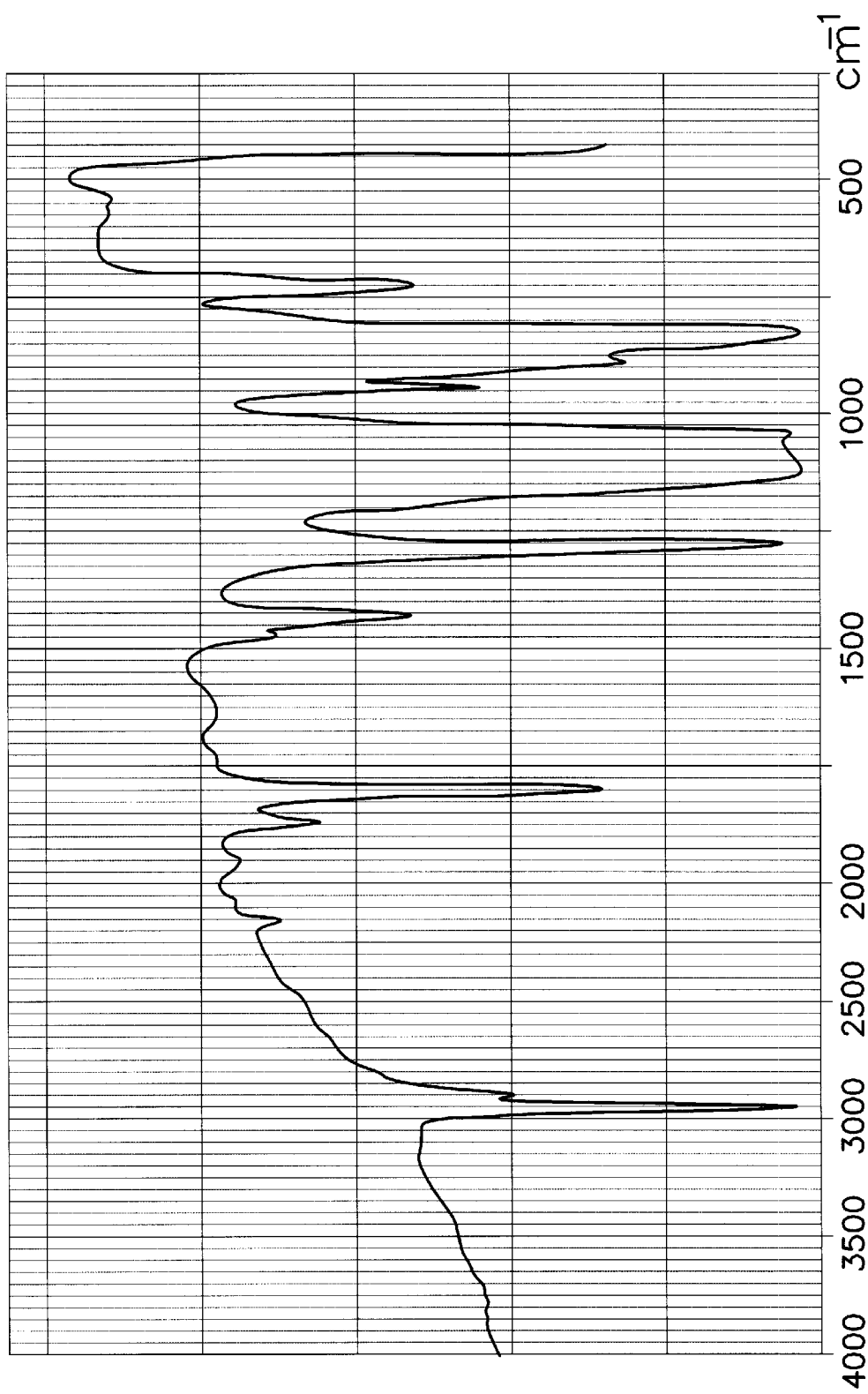
FIG. 2. An infrared absorption spectral trace of the organopolysiloxane containing carboxylic anhydride groups that was prepared in Reference Example 2.
Figure 3:
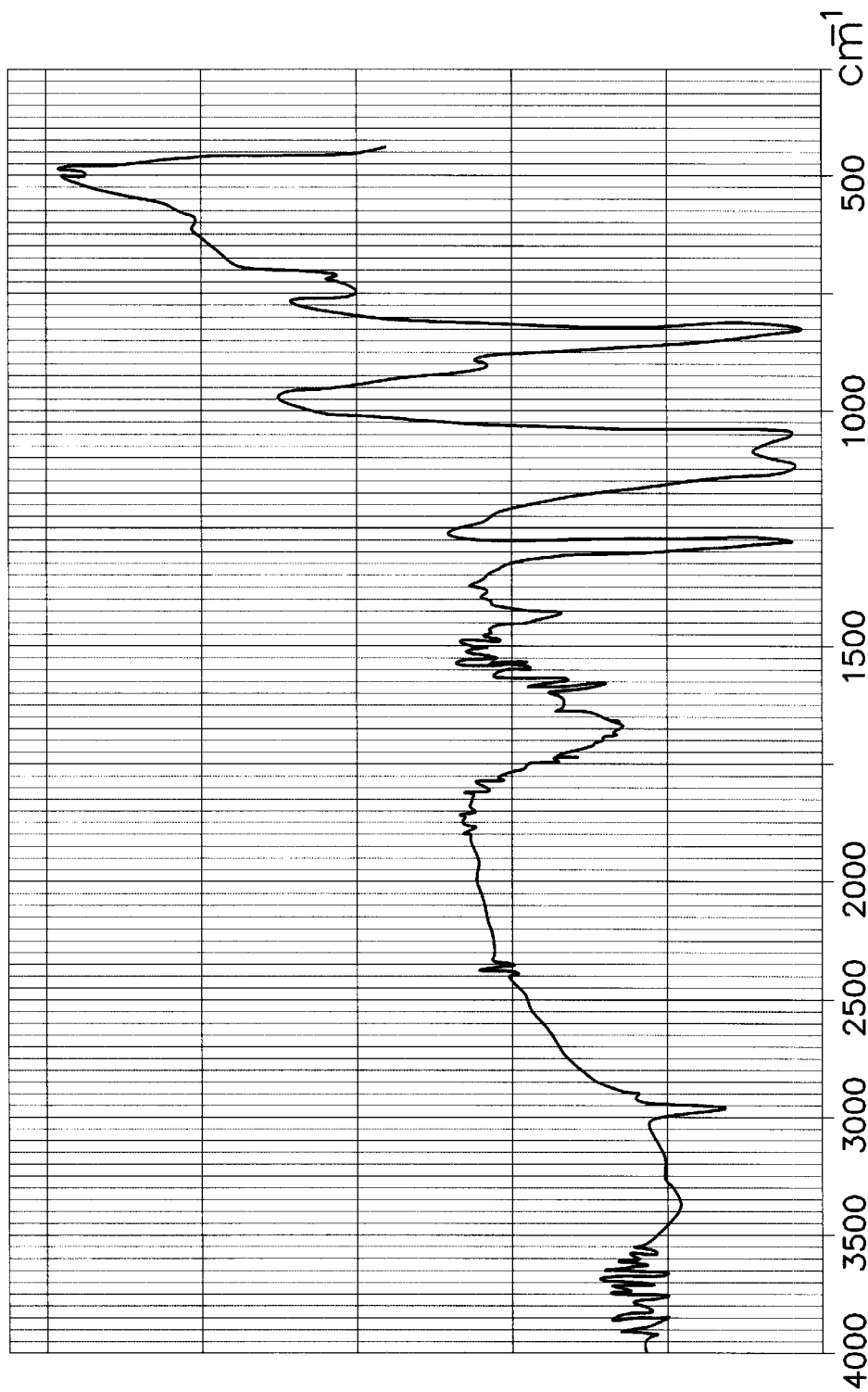
FIG. 3. An infrared absorption spectral trace of the arginine-modified dimethylpolysiloxane prepared in Working Example 1.
Figure 4:
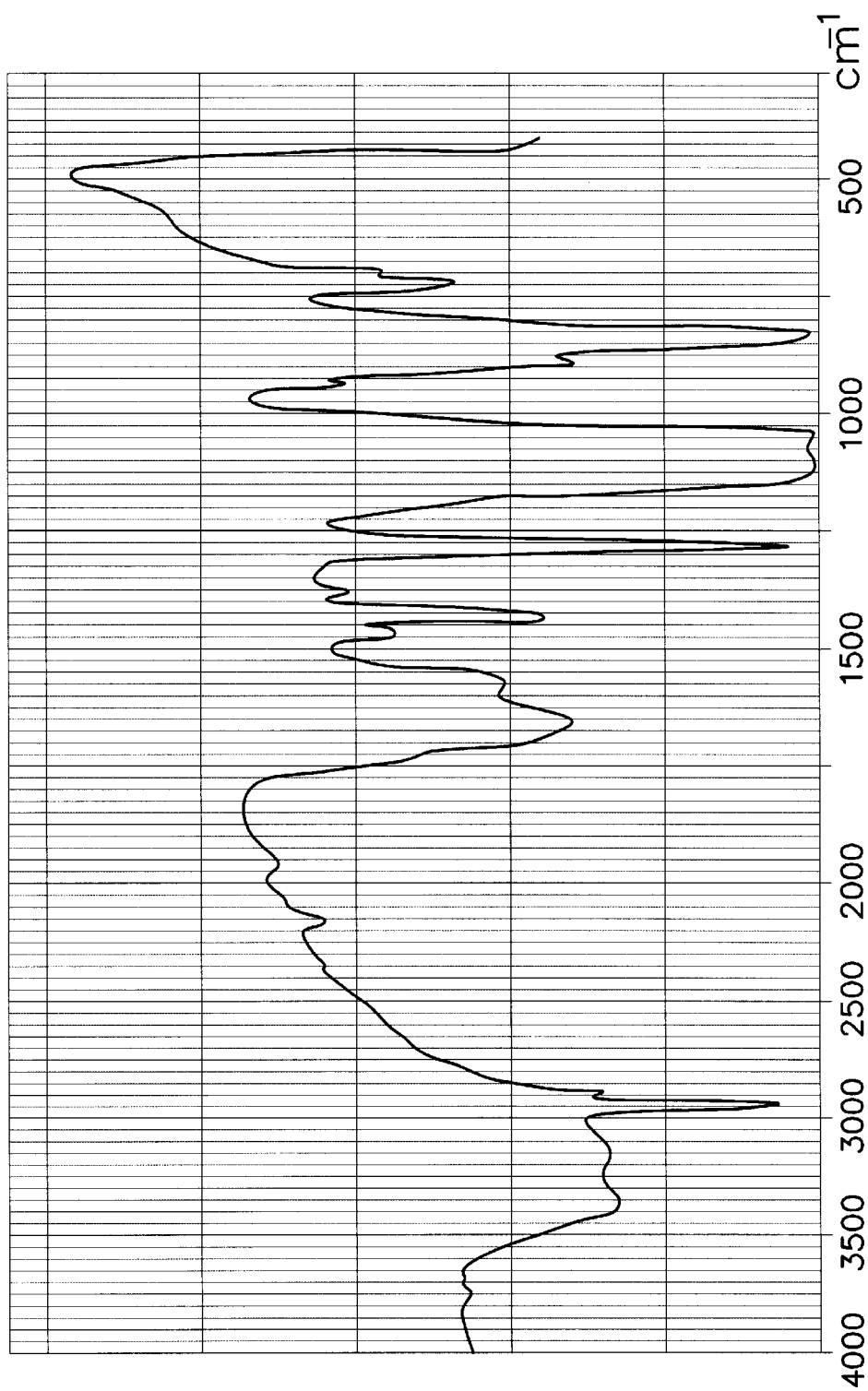
FIG. 4. An infrared absorption spectral trace of the arginine-modified organopolysiloxane prepared in Working Example 2.

The present invention relates to a method for producing a basic amino acid-modified organopolysiloxane comprising reacting (A) a basic amino acid with (B) an organopolysiloxane having carboxylic anhydride groups bonded to silicon atoms. The method for producing a basic amino acid-modified organopolysiloxane in accordance with the present invention will now be described.

Examples of the basic amino acids belonging to component (A) include lysine, hydroxylysine, arginine, and histidine, with arginine being particularly preferred.

Component (B) is an organopolysiloxane in which carboxylic anhydride groups are bonded to intramolecular silicon atoms. This organopolysiloxane may, for example, have a straight-chain structure, a partially branched straight-chain structure, a branched structure, a cyclic structure, or a dendritic structure, with the straight-chain structure being preferred. Examples of the carboxylic anhydride groups of component (B) include groups described by formulas:

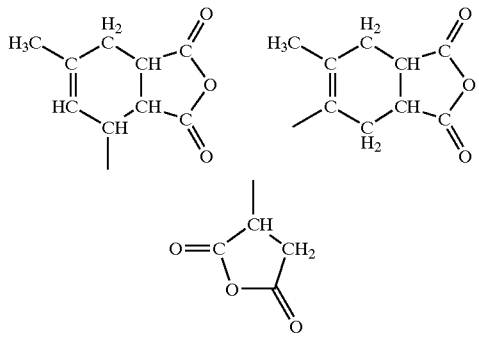

The carboxylic anhydride groups may be bonded to the silicon atoms in the organopolysiloxane either directly or via divalent organic groups such as methylene, ethylene, propylene, and other alkylene groups; or methylene oxyethylene, ethylene oxypropylene, propylene oxypropylene, and other alkylene oxyalkylene groups. Additional examples of the groups bonded to the silicon atoms in component (B) include monovalent hydrocarbon groups such as methyl, ethyl, propyl, and other alkyl groups; vinyl, allyl, butenyl, and other alkenyl groups; phenyl, tolyl xylyl, and other aryl groups; benzyl, phenethyl, and other aralkyl groups; methoxy, ethoxy, and other alkoxy groups; hydroxyl groups; and hydrogen atoms.

The organopolysiloxanes described by the general formulas below can be cited as examples of the organopolysiloxanes belonging to component (B). In the formulas, X represents the aforementioned carboxylic anhydride groups; R represents the aforementioned monovalent hydrocarbon groups, alkoxy groups, hydroxyl groups, or hydrogen atoms; m and n are positive integers; p is an integer of 3 or greater; and q and r are positive integers such that q+r is a positive integer of 3 or greater.

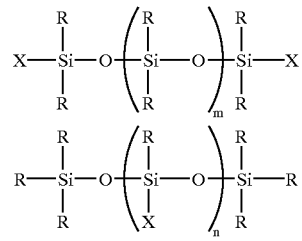

-continued

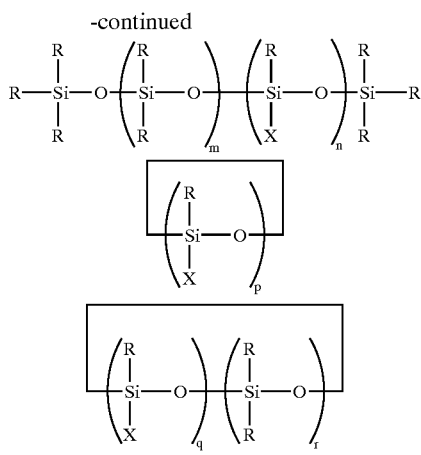

Examples of methods for preparing the organopolysiloxanes of component (B) include methods in which addition reactions are conducted between norbornene dicarboxylic anhydrides and organopolysiloxanes with hydrogen atoms bonded to silicon atoms; methods for oxidizing 1,3-bis (dimethylphenyl)disiloxane derivatives; methods in which a Diels-Alder reaction is conducted between maleic anhydride and organopolysiloxanes containing cyclopentadienyl groups (see Japanese Patent Application Laying Open No. Sho 63-270690 and Japanese Patent Application Laying Open No. Sho 63-316790); methods in which an addition reaction is conducted in the presence of a platinum-based catalyst between 1,4-dichlorobutane and an organopolysiloxane with hydrogen atoms bonded to silicon atoms, the resulting addition product is reduced by zinc to 2-silyl substituted-1,3-butadiene and a Diels-Alder reaction is conducted between this reduction product and maleic anhydride; methods in which an addition reaction is conducted in the presence of a platinum-based catalyst between an alkynyl alcohol and an organopolysiloxane with hydrogen atoms bonded to silicon atoms, the resulting addition product is heated and allowed to undergo a dehydration reaction involving maleic anhydride to form a diene, and a Diels-Alder reaction is then allowed to occur (see Japanese Patent Application Laying Open No. Hei 3-109428); methods in which 2-magnesium halide-1,3-butadiene and an organopolysiloxane containing halosilyl groups are allowed to react with each other to obtain an organopolysiloxane containing butadienyl groups, and a Diels-Alder reaction is then conducted between maleic anhydride and the product (see Japanese Patent Application Laying Open No. Hei 4-211091); methods in which a Diels-Alder reaction is performed between maleic anhydride and a disiloxane containing cyclopentadienyl alkyl groups (see Japanese Patent Application Laying Open No. Hei 4-89492); and methods in which an addition reaction is conducted between a succinic anhydride containing alkenyl groups and a functional organopolysiloxane with hydrogen atoms bonded to silicon atoms (see Japanese Patent Application Laying Open No. Hei 5-331291).

The present method is characterized in that a basic amino acid-modified organopolysiloxane is prepared by reacting hydrogen atoms bonded to the nitrogen atoms in component (A) and the carboxylic anhydride groups in component (B) to produce carboxy groups and nitrogen atom-carbonyl bonds. Although the reaction can proceed at room temperature, it is preferable to heat the system to 50–150° C., and particularly 60–110° C., in order to promote the reaction.

Although the present method allows the reaction to be performed in the absence of a solvent, using an organic solvent is commonly more preferable for improving the affinity of components (A) and (B) and achieving a higher reaction velocity because these components have low initial affinity. The organic solvents that can be used in the present method are not subject to any particular limitations as long as these solvents are substantially inert in relation to components (A) and (B). Even when these organic solvents can react with component (A) or (B), they can still be used as long as the reaction between components (A) and (B) is much faster than the reaction between the components and the solvents. Examples of organic solvents that can be used in the present method include benzene, toluene, xylene, and other aromatic hydrocarbons; hexane, pentane, and other aliphatic hydrocarbons; tetrahydrofuran, diethyl ether, and other ethers; methanol, ethanol, propanol, and other alcohols; acetone, methylethyl ketone, methylisobutyl ketone, and other ketones; as well as N,N-dimethylformamide, dimethylsulfoxide, and hexamethyl phosphoramide. Alcohols, ethers, and amides are preferred because of their high affinity for components (A) and (B).

In the present method, the basic amino acid-modified organopolysiloxane can be purified by optionally filtering the product resulting from the reaction between components (A) and (B), separating the unreacted components, and distilling off the organic solvents and other low-boiling products at a reduced pressure and elevated temperature.

Working Examples

The method for producing a basic amino acid-modified organopolysiloxane in accordance with the present invention will now be described in further detail through working examples.

Reference Example 1. 2-Methyl-3-butyn-2-ol (2 g, 23.8 mmol) was heated to 100° C. in a nitrogen atmosphere together with a 1,3-divinyltetramethyldisiloxane complex whose platinum content was such that the amount of platinum metal was 5 ppm in relation to the combined weight of the reaction mixture. A dimethylpolysiloxane (17.7 g; hydrogen bonded to silicon atoms: 21.6 mmol) of the average formula

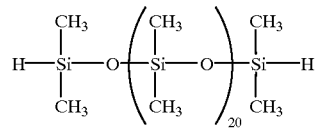

in which both ends of the molecular chain were blocked with dimethyl hydrogen siloxy groups was added in drops to the reaction mixture. After the dropwise addition had been completed, the reaction mixture was agitated for 1.5 hours at 110° C. The reaction mixture was then sampled and analyzed by infrared absorption spectroscopy, whereupon it was confirmed that the absorption spectra characteristic of hydrogen bonded to silicon atoms had disappeared. The reaction mixture was heated at a reduced pressure, and excess 2-methyl-3-butyn-2-ol and other low-boiling products were distilled off, yielding 19 g of a polymer. This polymer was analyzed by nuclear magnetic resonance and infrared absorption spectroscopy and found to be a dimethylpolysiloxane containing alkenol groups and having the average formula shown below. The isomer ratio was 70:30.

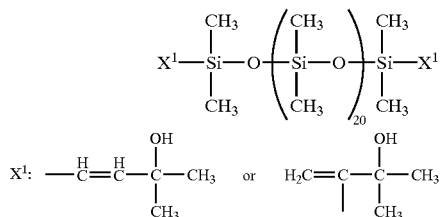

Molar ratio; 70:30

The aforementioned dimethylpolysiloxane containing alkenol groups (15 g), maleic anhydride (3.26 g, 33.2 nunol), and xylene (6.5 mL) were subsequently introduced and reacted for 4 hours at 140–150° C., while reaction water was azeotropically removed. The system was then cooled, and excess maleic anhydride precipitate was filtered out. The filtrate was heated at a reduced pressure and the low-boiling products were distilled off yielding 15.2 g of a polymer. This polymer was analyzed by nuclear magnetic resonance and infrared absorption spectroscopy and found to be a dimethyl polysiloxane containing carboxylic anhydride groups ($X^2$ below) and having the average formula shown below

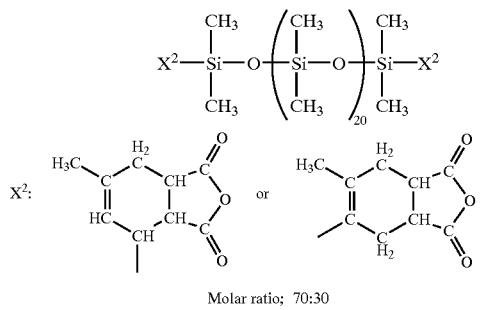

Molar ratio; 70:30

Reference Example 2. A copolymer (100 g; hydrogen bonded to silicon atoms: 53.9 mmol) of methylhydrogensiloxane and a dimethylsiloxane in which the two ends of the molecular chain were blocked with trmethylsiloxy groups described by general formula

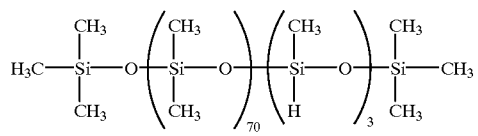

was heated to 80° C. in a nitrogen atmosphere together with a 1,3-divinyltetramethyldisiloxane complex whose platinum content was such that the amount of platinum metal was 5 ppm in relation to the combined weight of the reaction mixture. Allylsuccinic anhydride (7.4 g, 52.8 mmol) was added in drops to the reaction mixture. After the dropwise addition had been completed, the reaction mixture was agitated for 5 hours at 80–100° C. The reaction mixture was heated at a reduced pressure and the low-boiling products were distilled off, yielding 102.2 g of a polymer. This polymer was analyzed by nuclear magnetic resonance and infrared absorption spectroscopy and found to be an organopolysiloxane containing carboxylic anhydride groups and having the average formula shown below

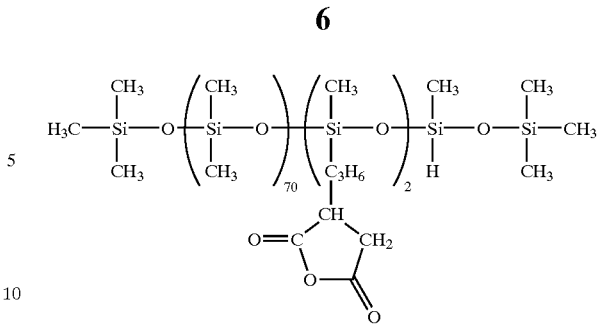

Working Example 1. The dimethylpolysiloxane containing carboxylic anhydride groups that was prepared in Reference Example 1 (10 g; carboxylic anhydride groups: 10.0 mnmol), L-arginine (1.9 g, 11 mmol), and ethanol (20 mL) were mixed and refluxed for 2 hours while heated, yielding a transparent solution. This solution was analyzed by infrared absorption spectroscopy and found to have amide bond absorption but to be completely devoid of carboxylic anhydride absorption. Ester bond absorption could only be observed along the shoulders of arnide bond absorption. The solution was heated at a reduced pressure and the low-boiling products were distilled off, yielding 11.7 g of a solid polymer. This polymer was analyzed by nuclear magnetic resonance and infrared absorption spectroscopy and found to be an arginine-modified dimethylpolysiloxane.

Working Example 2. The organopolysiloxane containing carboxylic anhydride groups that was prepared in Reference Example 2 (30 g; carboxylic anhydride groups: 14.8 mmol), L-arginine (2.8 g, 16.3 mmol), and ethanol (35 g) were mixed and refluxed for 0.5 hour while heated. The resulting solution was analyzed by infrared absorption spectroscopy and found to have amide bond absorption but to be completely devoid of carboxylic anhydride absorption. Ester bond absorption could only be observed along the shoulders of amide bonds. The slightly precipitated excess L-arginine was filtered off, the filtrate was heated at a reduced pressure, and the low-boiling products were distilled off, yielding 32.5 g of a solid polymer. This polymer was analyzed by nuclear magnetic resonance and infrared absorption spectroscopy and found to be an arginine-modified organopolysiloxane.

What is claimed is:

1. A method for producing a basic amino acid-modified organopolysiloxane comprising reacting (A) a basic amino acid with (B) an organopolysiloxane having carboxylic anhydride groups bonded to silicon atoms.

2. A method for producing a basic amino acid-modified organopolysiloxane as defined in claim 1, where the basic amino acid of component (A) is arginine.

3. A method for producing a basic amino acid-modified organopolysiloxane as defined in claim 1, where the carboxylic anhydride groups of component (B) are selected from the group consisting of the formulas

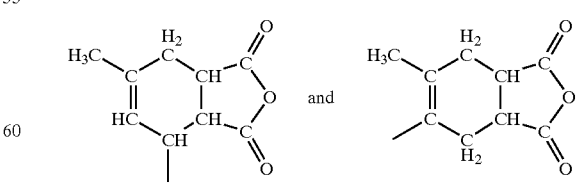

4. A method for producing a basic amino acid-modified organopolysiloxane as defined in claim 1, where the carboxylic anhydride groups of component (B) are groups described by formula

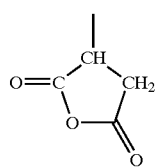

5. A method for producing a basic amino acid-modified organopolysiloxane as defined in claim 1, where the reacting is effected at a temperature of 60 to 110° C.

6. A method for producing a basic amino acid-modified organopolysiloxane as defined in claim 1 further comprising an organic solvent.

7. A method for producing a basic amino acid-modified organopolysiloxane as defined in claim 6, where the organic solvent is selected from the group consisting of alcohol, ether, and amide.

* * * * *